Sept. 23, 1930.                C. L. KNUTSON                 1,776,512
                                SNAP FASTENER
                              Filed Dec. 31, 1927
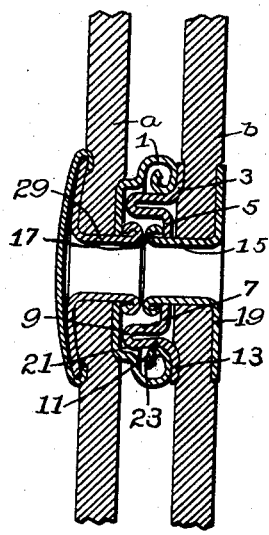
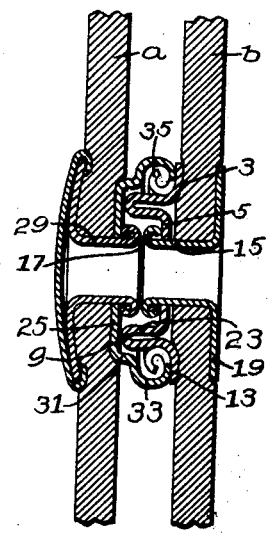
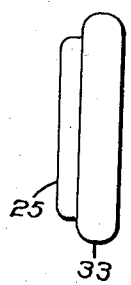
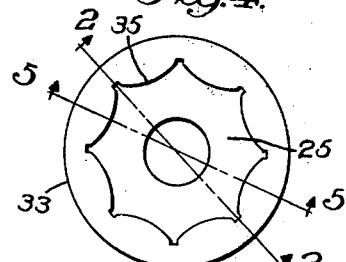
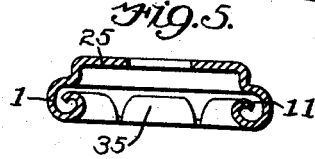
Inventor
Carl L. Knutson
By
Rector, Hibben, Davis & Macauley, Attys Patented Sept. 23, 1930

1,776,512

UNITED STATES PATENT OFFICE

CARL L. KNUTSON, OF MAYWOOD, ILLINOIS, ASSIGNOR TO CINCH MANUFACTURING CORPORATION, OF CHICAGO, ILLINOIS, A CORPORATION OF ILLINOIS

SNAP FASTENER

Application filed December 31, 1927. Serial No. 244,024.

This application is a continuation in part of my co-pending application Serial No. 217,093, filed September 2, 1927.

My invention, which relates to snap fasteners and has among its objects the provision of a fastener of durable construction and improved action, will be best understood from the following description when read in the light of the accompanying drawings of one specific embodiment of the invention, while the scope of the invention will be more particularly pointed out in the appended claims.

In the drawings Figure 1 is a longitudinal section on an enlarged scale of a snap fastener constructed according to the invention, the socket and stud of the fastener being shown in engaged relation;

Fig. 2 is a view similar to Fig. 1, except that it corresponds with respect to the socket to a section on the line 2—2 of Fig. 4;

Fig. 3 is a side elevation on the socket of the fastener;

Fig. 4 is an elevation of the socket as viewed from the right of Fig. 3; and

Fig. 5 is a section on the line 5—5 of Fig. 4.

Referring to the drawings, the fastener for convenience of illustration only is shown as arranged for detachably securing to each other fabric sheets $a$ and $b$, the sheet $a$ having attached thereto the socket 1, and the sheet $b$ having attached thereto the stud 3, which is adapted to be removably inserted into the socket.

As illustrated, the stud comprises a perforated intermediate transverse portion 5 having a marginal wall 7 which at its outer edge is reversely turned as at 9 to provide an outer wall 11 which carries a base flange 13. For securing the stud to the fabric sheet, there is provided a tubular rivet the shank 15 of which is inserted through the perforation in the portion 5 of the stud and headed as at 17, said shank extending through a perforation in the fabric sheet $b$ and having a flanged head 19 resting against the side of the fabric sheet opposite the base flange 13 of the stud so as to clamp said sheet between said portions and thus securely hold the stud. It should be understood that the same type of stud may be secured to any suitable support in any suitable manner.

As shown, the outer wall 11 of the stud is tapered from the portion 9 to the base flange 13 so as to present a stud having a head 21 and a neck 23.

As herein illustrated, the socket has a base 25 perforated at 27 for reception of the shank 29 of a tubular rivet, the latter for securing the socket to the fabric sheet $a$ in a manner similar to that described in connection with the stud.

As clearly shown by Fig. 2, the base 25 of the socket has integrally formed therewith a continuous marginal wall having a portion 31 generally perpendicular to the plane of the base and an outer portion 33 which is generally channel-shaped in cross-section, that is to say concave with respect to the socket axis, this construction affording a rigid body portion for the socket. As shown, the outer edge of the portion 33 of the marginal wall has integrally formed therewith the bases of jaws 35 for engaging the stud, said jaws being bent in respect to planes including the socket axis to present jaw faces which are convex with respect to said axis.

As herein illustrated, the jaws 35 in respect to planes transverse to the socket axis are convex with respect to said axis, the faces of the jaws not necessarily, but preferably, being spheroidal. By making the jaws convex with respect to the socket axis in planes transverse to said axis, the stud may be inserted or removed relative to the socket with minimum transverse or radial movement of the jaws, this movement being much less than occurs under similar conditions with socket constructions wherein the faces of the jaws are concentric with the socket axis, as has heretofore been proposed. This permits the jaws to be made of heavier and stiffer material than has heretofore been possible, with less strain on the jaws and better securing of the stud in the socket. Further, this construction causes the faces of the jaws in planes transverse to the socket axis tangentially to engage with the stud, thereby permitting insertion or removal of the stud with much less friction between these parts than possible with the prior construction above referred to wherein the head of the stud during insertion or removal engages with the opposite edges of the faces of the jaws. This construction of having the jaws convex with respect to the socket axis both in planes transverse to said axis and in planes including said axis results in securing point to point contact between the jaws and head of the stud during insertion or removal of the latter, thereby reducing to a minimum the frictional resistance during the entrance and removal of the stud. The before-mentioned advantages would in some degree be presented by a construction wherein the ends of the jaws, considered in planes transverse to the axis of the socket, were straight or of concave construction and of such great radius as to bear against the stud at their central portions only. However, I prefer the convex jaw construction illustrated because it is stronger and provides a somewhat improved action. Furthermore, by providing relatively wide jaws which make only tangential contact with the stud there is less possibility for the jaws to set.

It will be observed that the specific embodiment of the invention illustrated comprises a socket the base of which carries an unbroken, continuous, marginal wall so formed as to secure great rigidity, the outer edges of the wall adjacent the socket opening being integrally formed with the bases of the jaws.

I have described a preferred embodiment of my invention, but I wish to have it understood that I do not limit the scope of my invention by so doing and reference is made particularly to the following claims for the scope of my invention.

I claim:

1. A snap fastener socket formed of sheet metal to present a supporting base carrying at the periphery thereof a continuous unbroken lateral wall of generally channel-shaped cross-section with the open side of said channel facing the socket axis, said wall extending from said base to a position adjacent the socket opening, the edge of said wall adjacent said socket opening having formed integrally therewith a plurality of circumferentially distributed members formed to provide springs having fastener-stud-head engaging portions interiorly of said wall, the inner portions of said springs being bent toward said wall.

2. A snap fastener socket formed of sheet metal to present a supporting base carrying at the periphery thereof a continuous unbroken lateral wall of generally channel-shaped cross-section with the open side of said channel facing the socket axis, said wall extending from said base to a position adjacent the socket opening, the edge of said wall adjacent said socket opening having formed integrally therewith a plurality of circumferentially distributed generally C-shaped members surrounded by said wall and curved toward said base and the inner side of said wall to provide jaws for detachably securing the head of a fastener stud when inserted in said socket.

3. A snap fastener socket formed of sheet metal to present a supporting base having a rigid continuous unbroken lateral wall at the periphery thereof extending from said base to a position adjacent the socket opening, said wall carrying a plurality of separate circumferentially distributed, closely adjacent, resilient stud-engaging jaws, said jaws surrounded by said wall and having bases formed integrally with said wall substantially at the plane of the socket opening and being formed to present a socket of minimum interior diameter at a plane transverse to the axis of said socket between said supporting base and socket opening, said jaws in planes including the axis of said socket presenting smooth, unbroken curves.

4. A snap fastener socket formed of sheet metal to present a supporting base carrying a rigid continuous unbroken lateral wall of generally channel-shaped cross-section with the open side of said channel facing the socket axis, said wall at the edge thereof remote from said base integrally carrying a plurality of separate circumferentially distributed stud-retaining jaws, the latter bent to form springs joined to said edge and having fastener-stud-head engaging portions surrounded by said wall, each jaw as a whole being convex in respect to the socket axis in planes including said axis, and the stud-head-engaging portion thereof being convex in respect to said axis in planes transverse to said axis.

5. A snap fastener socket formed of sheet metal to present a supporting base carrying at the periphery thereof a continuous unbroken lateral wall of generally channel-shaped cross-section with the open side of said channel facing the socket axis, said wall extending to adjacent the socket opening, the edge of said wall adjacent said opening having formed integrally therewith a plurality of circumferentially distributed members formed to provide springs having fastener-stud-head engaging jaws surrounded by said wall, the inner portions of said jaws being bent toward said wall, each jaw as a whole being convex in respect to the socket axis in planes including said axis, and the stud-head-engaging portion thereof being convex in respect to said axis in planes transverse to said axis.

6. A snap fastener socket formed of sheet metal to present a supporting base carrying at the periphery thereof a continuous unbroken lateral wall of generally channel-shaped cross-section with the open side of said channel facing the socket axis, said wall extending to adjacent the socket opening, the edge of said wall adjacent said opening having formed integrally therewith a plurality of circumferentially distributed generally C-shaped members surrounded by said wall and curved toward said supporting base and the inner side of said wall to provide jaws for detachably securing the head of a fastener stud when inserted in said socket, those portions of said C-shaped members which are nearest the socket axis being convex in respect to said axis in planes transverse to said axis.

7. A snap fastener socket formed of sheet metal to present a supporting base having a rigid continuous unbroken lateral wall at the periphery thereof extending from said base to a position adjacent the socket opening, said wall carrying a plurality of separate circumferentially distributed, closely adjacent, resilient stud-engaging jaws surrounded by said wall, said jaws having bases formed integrally with said wall substantially at the plane of the socket opening and being formed to present a socket of minimum interior diameter at a plane transverse to the axis of said socket between said supporting base and said socket opening, said jaws in said plane being convex with respect to said axis, and in planes including said axis presenting smooth unbroken curves.

8. In a separable fastener, a substantially rigid cup in which the head of a male member is received, comprising a continuous unbroken wall and spring-retainers formed integral therewith and surrounded by said wall, said spring-retainers arranged about the inside of the cup and each retainer presenting a portion of substantial width facing toward the center of the cup, said portion intermediate its width being formed to provide only a relatively small surface in contact with the male member.

9. In a separable fastener, a substantially rigid cup in which the head of a male member is received, comprising a continuous unbroken wall and spring-retainers formed integral therewith and surrounded by said wall, said spring-retainers arranged about the inside of the cup and each retainer presenting a portion of substantial width facing toward the center of the cup, said portion intermediate its width being formed to permit only single point contact with the male member.

10. In a separable fastener, and in combination with the male member thereof, a female member comprising a cup in which the head of the male member is received; said cup being struck up from a single piece of sheet metal and comprising a bottom, a rearwardly extending flange surrounding said bottom, and a hollow bead having a continuous, uninterrupted outer wall at the rear edge of said flange; and spring retainers extending from the rear edge of said bead with their ends within said bead.

In testimony whereof, I have subscribed my name.

CARL L. KNUTSON.